(12) United States Patent
Thiagarajan

(10) Patent No.: US 10,250,416 B2
(45) Date of Patent: Apr. 2, 2019

(54) RECURSIVE DIFFERENCE FILTER REALIZATION OF DIGITAL FILTERS

(71) Applicant: MMRFIC Technology Pvt. Ltd., Bangalore (IN)

(72) Inventor: Ganesan Thiagarajan, Bangaluru (IN)

(73) Assignee: MMRFIC Technology Pvt. Ltd.

( * ) Notice: Subject to any disclaimer, the term of this patent is extended or adjusted under 35 U.S.C. 154(b) by 14 days.

(21) Appl. No.: 15/678,146

(22) Filed: Aug. 16, 2017

(65) Prior Publication Data

US 2018/0337805 A1     Nov. 22, 2018

(30) Foreign Application Priority Data

May 17, 2017   (IN) .............................. 201741017348

(51) Int. Cl.
*H04L 25/03*     (2006.01)

(52) U.S. Cl.
CPC .............................. *H04L 25/03076* (2013.01)

(58) Field of Classification Search
CPC ............ G11B 20/10046; H04N 19/117; H04N 19/82; G10H 1/125; G10H 2250/115; H04M 9/082; Y10S 84/09; H04L 25/03076

See application file for complete search history.

(56) References Cited

U.S. PATENT DOCUMENTS

| | | | | |
|---|---|---|---|---|
| 5,097,235 A | * | 3/1992 | Reichel | H03H 11/04 333/166 |
| 5,471,504 A | * | 11/1995 | Lee | H04L 25/03057 375/229 |
| 6,690,839 B1 | * | 2/2004 | Ferguson | G06T 7/001 348/192 |
| 2009/0175336 A1 | * | 7/2009 | Karczewicz | H04N 19/176 375/240.12 |

* cited by examiner

*Primary Examiner* — Khanh C Tran

(57) ABSTRACT

According to an aspect of the present disclosure, a method comprises computing first set of coefficients of a digital filter providing first filter performance, computing a second set of coefficients from the first set of coefficients, forming a difference digital filter with second set of coefficients to produce a difference filter output and adding a compensation factor to the difference filter output to achieve a second performance identical to the first filter performance. According to another aspect, the second set of coefficients are computed as difference between the successive first set of coefficients such that when the first set of coefficients comprises N number of coefficients, the second set of coefficients comprises N-1 number of coefficients. The method further comprises computing first set of coefficients according to a first relation, computing the second set of coefficients according to a second relation, generating the difference filter output in accordance with a third relation, computing a compensation factor in accordance with a fourth relation and generating a filtered output samples from a set of input samples in accordance with a fifth relation.

16 Claims, 8 Drawing Sheets

RECURSIVE DIFFERENCE FILTER REALIZATION OF DIGITAL FILTERS

CROSS REFERENCES TO RELATED APPLICATIONS

This application claims priority from Indian patent application No. 201741017348 filed on May 17, 2017 which is incorporated herein in its entirety by reference.

BACKGROUND

Technical Field

Embodiments of the present disclosure relate generally to system, method and apparatus of digital signal processing and in particular to digital filter realization with reduced complexity.

Related Art

The digital signal is processed for efficient transmission, reception, rendering and for storing information. The information in analog form is often digitized for processing in digital domain. Digital filter operation is one of the signals processing operations performed on the information bits to eliminate or remove the unwanted information component. Digital Filters are often deployed for elimination of unwanted information in the certain frequency bands or ranges. For example, Infinite Impulse response (IIR) filters, Finite Impulse Response (FIR) filters and autoregressive-moving-average (ARMA) filters are often deployed for the purpose. The filters are implemented as part of a digital processor operative to perform the desired operation by executing the set of instruction or within an integrated circuit with dedicated circuitry. The implementation is generally process intensive and/or complex in terms of circuit elements including multipliers, adders and the likes. It is desirable to reduce the complexity of implementation of these digital/discrete filters.

SUMMARY

According to an aspect of the present disclosure, a method comprises computing first set of coefficients of a digital filter providing first filter performance, computing a second set of coefficients from the first set of coefficients, forming a difference digital filter with second set of coefficients to produce a difference filter output and adding a compensation factor to the difference filter output to achieve a second performance identical to the first filter performance.

According to another aspect, the second set of coefficients are computed as difference between the successive first set of coefficients such that when the first set of coefficients comprises N number of coefficients, the second set of coefficients comprises N-1 number of coefficients. The method further comprises computing first set of coefficients according to a first relation, computing the second set of coefficients according to a second relation, generating the difference filter output in accordance with a third relation, computing a compensation factor in accordance with a fourth relation and generating a filtered output samples from a set of input samples in accordance with a fifth relation.

Several aspects are described below, with reference to diagrams. It should be understood that numerous specific details, relationships, and methods are set forth to provide a full understanding of the present disclosure. One who skilled in the relevant art, however, will readily recognize that the present disclosure can be practiced without one or more of the specific details, or with other methods, etc. In other instances, well-known structures or operations are not shown in detail to avoid obscuring the features of the present disclosure.

DETAILED DESCRIPTION OF THE PREFERRED EXAMPLES

Figure 1:
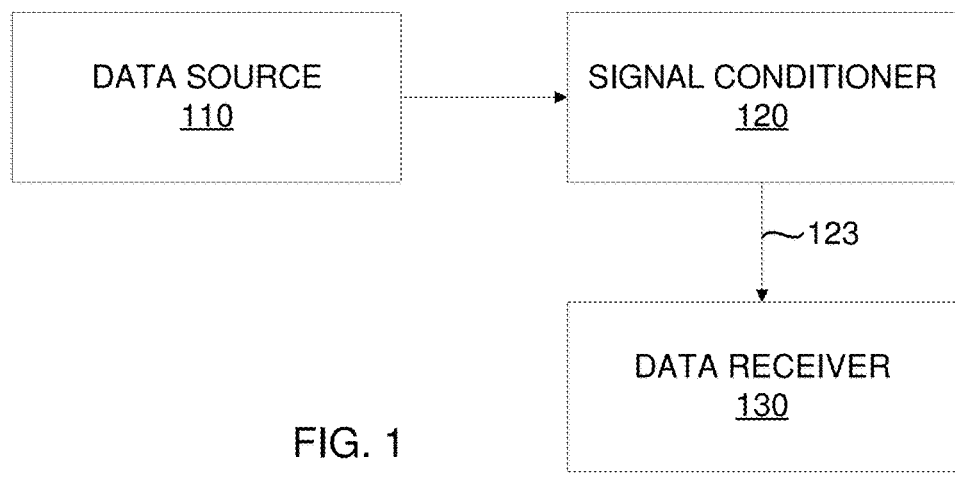
FIG. 1 is a block diagram illustrating an example system in which various aspects of the present disclosure may be seen.

FIG. 1 is a block diagram illustrating an example system in which various aspects of the present disclosure may be seen. The block diagram is shown comprising data source 110, signal conditioner 120 and data receiver 130. Each module is further described below.

The data source 110 provides data in digital form for signal processing and conditioning. For example, the data source may be representing a receiver front end circuitry receiving wireless signal through known protocol like Wi-Fi, Bluetooth, 4G, GSM, RF, Near Field Communication for example. Alternately, the Data source may also represent a circuitry converting analog signal to digital samples like Analog to Digital Convertor (ADC) converting voice/audio into sequence of binary digits.

The data receiver 130 receives conditioned or (processed) data bits from the signal conditioner 120 for further processing. For example, the data receiver 130 may comprise a transmitter section to transmit the data over wireless network, a receiver circuitry to decode the data stream and extract information for example.

The signal conditioner 120 performs signal conditioning operation and provides the conditioned data on path 123. The conditioned data on path 123 enable the data receiver 130 to perform desired operation on the sequence of data from the data source 110. For example, the signal conditioner may perform amplification, filter operation, level shifting operation, buffer, impedance matching, down conversion of frequency, up conversion of frequency, for example.

In one embodiment, the signal conditioner 120 performs filter operations such as low pass filter, band pass filter, high pass filter for example, to pass a desired frequency signal and stop other frequency signals. In that, the filters are designed to perform operation on the sequence of the binary digits representing the samples of information and provide the sequence of binary digits with removal of undesired information. The manner in which the signal conditioner 120 may be implemented with the reduced complexity is further described below by first describing conventional filter operations.

Figure 2A:
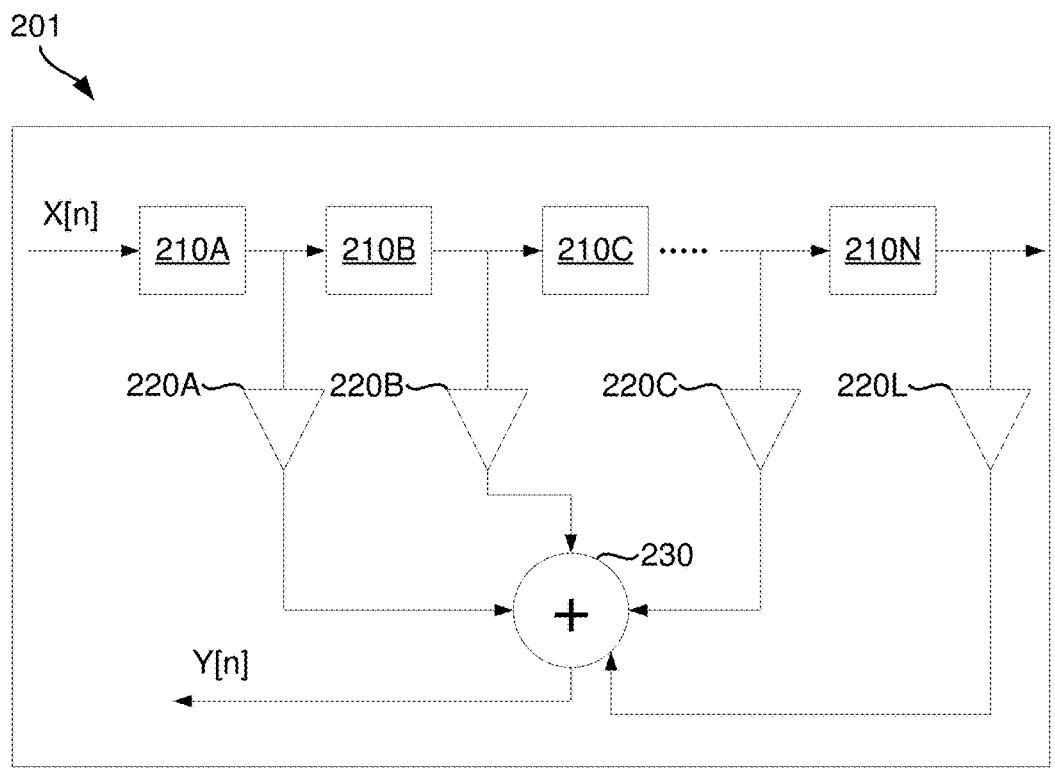
FIG. 2A is a conventional feed forward or Finite Impulse Response (FIR) filter.

FIG. 2A is a conventional feed forward or Finite Impulse Response (FIR) filter. As shown there the FIR filter comprises delay unit 210A through 210N, multiplier 220A through 220L and summing unit 230 together operate as FIR filter to produce sequence of output bits y[n] from the sequence of input bits x[n] as is well known in the art. For example, the output sequence y[n] is generated from the input sequence x[n] as per the relation:

$$y[n] = \sum_{l=0}^{L} b[l]x[n-l] \tag{1}$$

In that, the term b[*l*] represents the coefficients of multiplier 220A through 220L for l taking value of 0 to L. The Notation Σ represent the summing unit 230 and the term x[n−l] represents the output from the delay unit 210A through 210L. As is known in the art, the FIR filter 201 is commonly referred to as L Tap FIR filter or (L−1) order FIR filter. Each tap implements a multiplier to multiply coefficient b[l] with the corresponding delayed input data x[n−l].

Figure 2B:
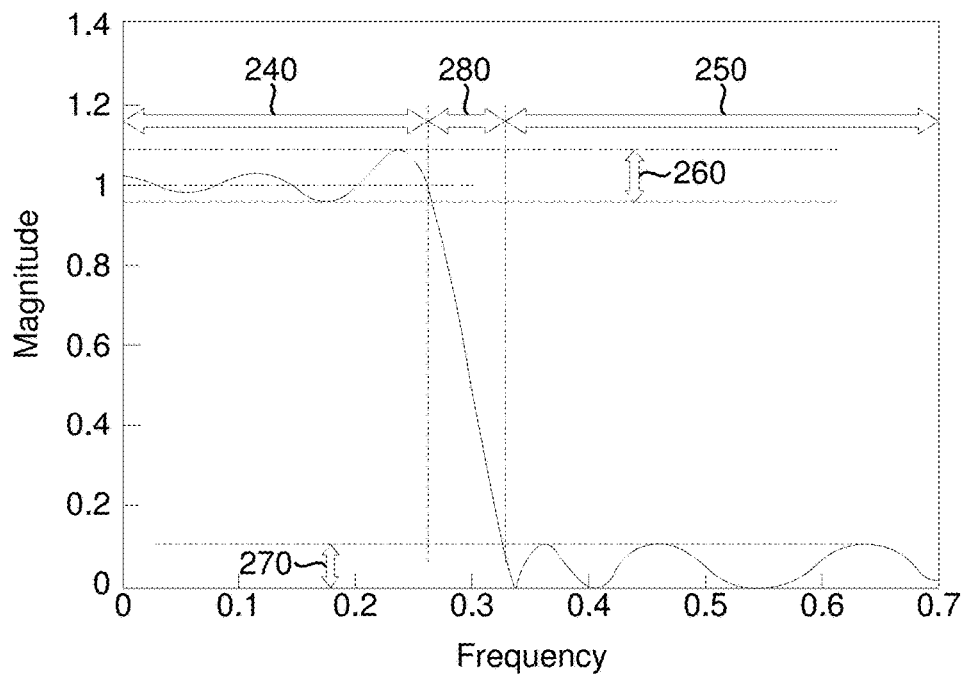
FIG. 2B is an example frequency response or characteristic of an FIR filter (also referred interchangeably as performance).

FIG. 2B is an example frequency response or characteristic of an FIR filter (also referred interchangeably as performance). The filter characteristic is shown with pass band 240, stop band 250, pass band ripple 260, stop band ripple 270 and transition band 280. The one or more characteristics may be adjusted, altered or set by selecting the number of taps, coefficients of multipliers using one or more known techniques.

Figure 3:
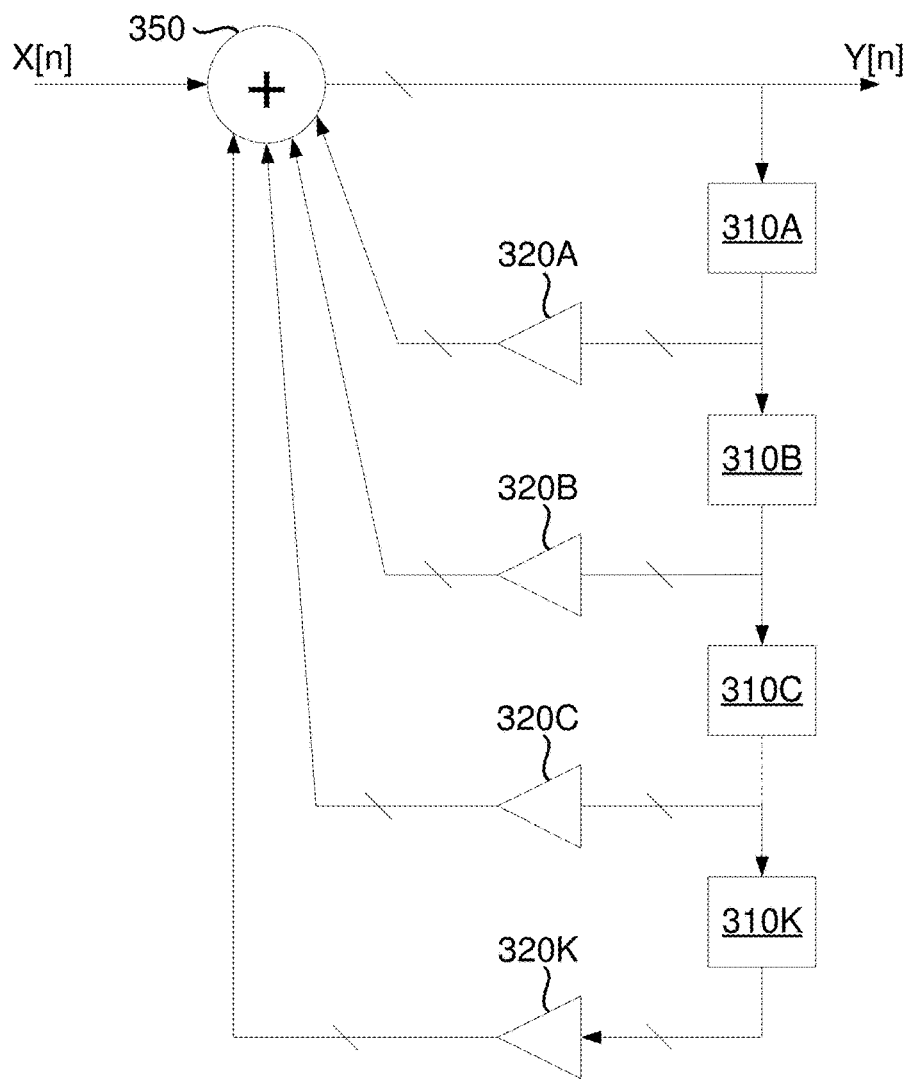
FIG. 3 is a conventional Infinite Impulse Response (IIR) filter (also referred as Autoregressive).

FIG. 3 is a conventional Infinite Impulse Response (IIR) filter (also referred as Autoregressive). As shown there the IIR filter comprises delay unit 310A through 310K, multiplier 320A through 320K and summing unit 350 together operate as IIR filter to produce sequence of output bits y[n] from the sequence of input bits x[n] as is well known in the art. For example, the output sequence y[n] is generated from the input sequence x[n] as per the relation:

$$y[n] = x[n] - \sum_{k=1}^{K} a[k]y[n-k] \tag{2}$$

In that, the term a[k] represents the coefficients of multiplier 320A through 320K for K taking value of 1 to K. The notation Σ represent the summing unit 350 and the term y[n−k] represents the output from the delay unit 310A through 310K.

Figure 4:
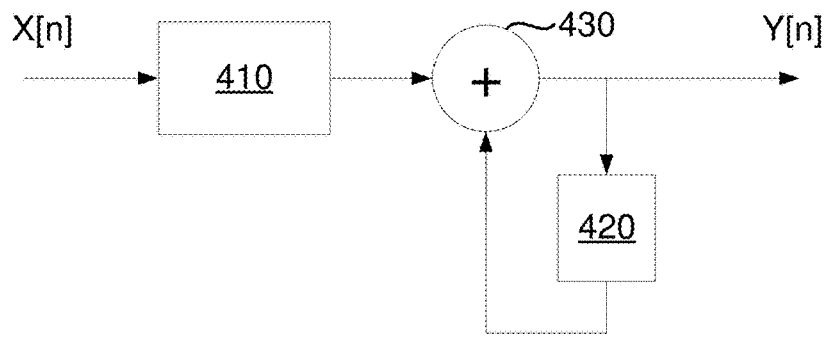
FIG. 4 is a conventional ARMA filter.

Similarly, FIG. 4 is a conventional ARMA filter. As shown there the ARMA filter 401 comprises IIR filter 410, FIR filter 420 and summation unit 430. The IIR 410 and FIR 420 are implemented similar to the conventional IIR in FIG. 3 and conventional FIR in FIG. 2A. The output sequence y[n] is generated from the input sequence x[n] as per the relation:

$$y[n] = \sum_{l=0}^{L} b[l]x[n-l] - \sum_{k=1}^{K} a[k]y[n-k] \tag{3}$$

As may be seen, each filter implementation comprises multiplication operation multiplying the tapped [delayed] input sequence with at least one of the multiplication coefficients b[l] and a[k]. Thus, requiring at least L or K numbers of multiplication operations. Often implementation of the filters (multipliers) is complex in terms of hardware, computation intensiveness and power consumption. In one prior technique, the complexity of implementation is reduced by choosing fixed coefficients. In one conventional implementation, canonical signed digit (CSD) representations are used in that, the multiplier is implemented using shift and add technique. In another conventional technique, the complexity is reduced by sharing resources such as multiplier by overlooking and reusing. In that, one multiplier is reused after one fetch or after read operation from the memory.

Figure 5:
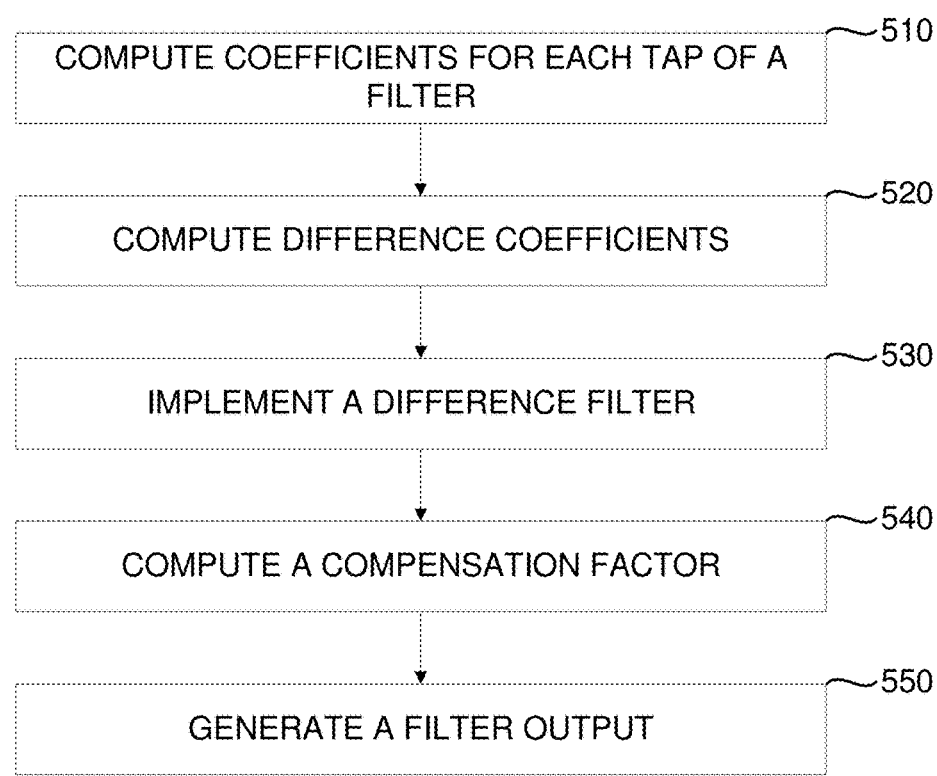
FIG. 5 is a block diagram illustrating example implementation of a filter in an embodiment.

FIG. 5 is a block diagram illustrating example implementation of a filter in an embodiment. In block 510, coefficients for each tap of a filter are computed for a desired performance or filter characteristic using conventional technique. For example, the coefficients b[l] and/or a[k] for L and/or K tap filter providing a desired performance as in relation (1) through (3).

In block 520, a set of difference coefficients representing difference between the adjacent coefficients (adjacent taps) are computed. For example, the difference coefficients may be computed by finding the difference between the b[0] and b[1], b[1] and b[2] so on.

In block 530, implementing a difference filter using the difference coefficients to generate a difference filter output $y_1[n]$. For example, the difference coefficients are multiplied with the corresponding tapped (delayed) input sequence and added to form a difference filter output.

In block 540, a compensation factor is computed for obtaining the desired filter characteristic of relation (1) through (3).

In block 550, a filter output is generated by adding difference filter output $y_1[n]$ to the compensation factor. In one embodiment the filter output y[n] is generated by relation: y[n]=$y_1$[n]+CF[n]. In that, CF[n] represent compensation factor.

Due to computation of the difference between the conventional coefficients, the difference coefficients, may be represented with fewer number of bits as against the a[k] or b[l], thereby reducing the complexity of multiplication in terms of computational power or hardware requirement while maintaining the performance of the filter on par with conventional filter of K or L tap with a[k] or b[l] coefficients. The manner in which each discrete filter may be implemented in example embodiments is further described below.

Figure 6:
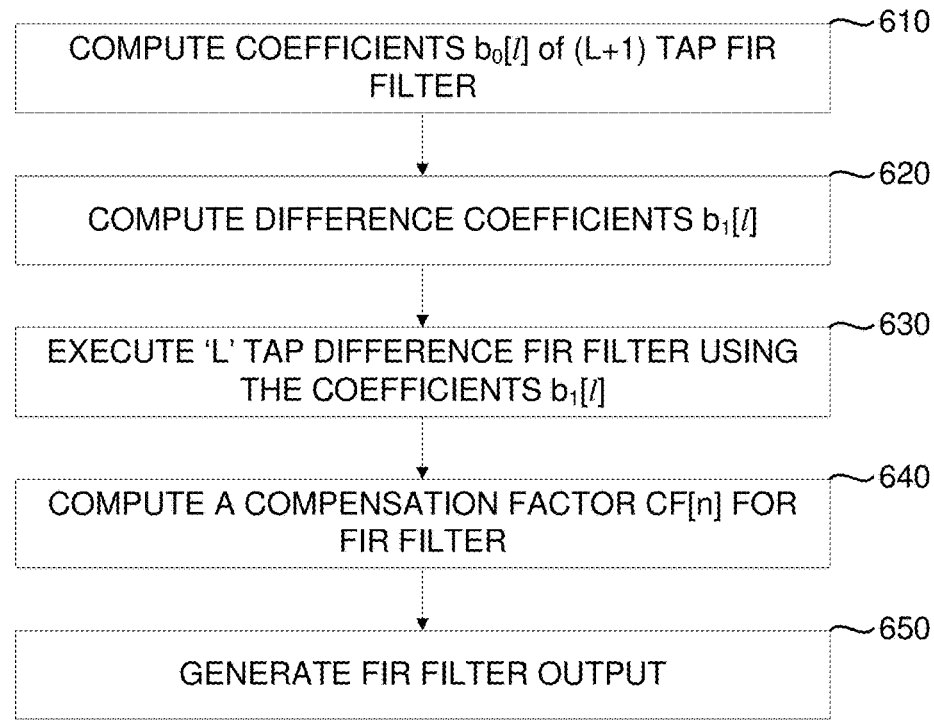
FIG. 6 is a block diagram illustrating example implementation of a FIR filter in an embodiment.

FIG. 6 is a block diagram illustrating example implementation of a FIR filter in an embodiment. The example implementation is described with respect performance of a conventional FIR filter represented by:

$y[n] = \sum_{l=0}^{L} b_0[l]x[n-1]$, in that $L$ is the order of the conventional FIR (4)

In the embodiment, in block 610, coefficients $b_0[l]$ of L order (L+1 tap) FIR filter are computed for a desired performance or filter characteristic.

In block 620, the difference coefficients $b_1[l]$ representing difference between the adjacent coefficients (adjacent taps) are computed. The deference coefficients $b_1[l]$ may be determined in an embodiment by relation:

$b_1[l] = b_0[l] - b_0[l-1]$ for every $l=1$ to $L$. (5)

In block 630, an L−1 (order) or L tap difference FIR filter is implemented using the coefficients $b_1[l]$. In one embodiment the L tap difference FIR filter may be implemented using relation:

$$y_1[n] = \sum_{q=0}^{L-1} (b_1[q])X[n-q-1] \quad (6)$$

In block 640, a compensation factor is computed. In one embodiment the compensation factor is determined using relation:

$CF[n] = b_0[0]x[n] + b_0[L]x[n-(L+1)] + y[n-1]$ (7)

In block 650, the filter output is generated by adding the L tap difference FIR filter output $y_1[n]$ to the compensation factor. In one embodiment the filter output $y[n]$ is generated by relation $y[n] = y_1[n] + CF[n]$. The filter operation in the embodiment may be may be represented as:

$$y[n] = \qquad (8)$$
$$y[n-1] + b_0[0]x[n] + b_0[L]x[n-(L+1)] + \sum_{q=0}^{L-1}(b_1[q])x[n-q-1]$$

Due to computation of the difference, the coefficients $b_1[l]$, may be represented with fewer number of bits as against the $b_0[l]$ thereby reducing the complexity of multiplication in terms of computational power or hardware requirement while maintaining the performance of the filter on par with L order FIR filter with coefficients $b_0[l]$ of relation (4). The relation (8) may be represented in frequency domain (for example, by taking Z-transform on both sides) as:

$$Y[z] = \left[\frac{z^{-1}B_1(z) + b_0[0] - b_0[L]z^{-(L+1)}}{1 - z^{-1}}\right]X[z]. \quad (8.a)$$

Figure 7:
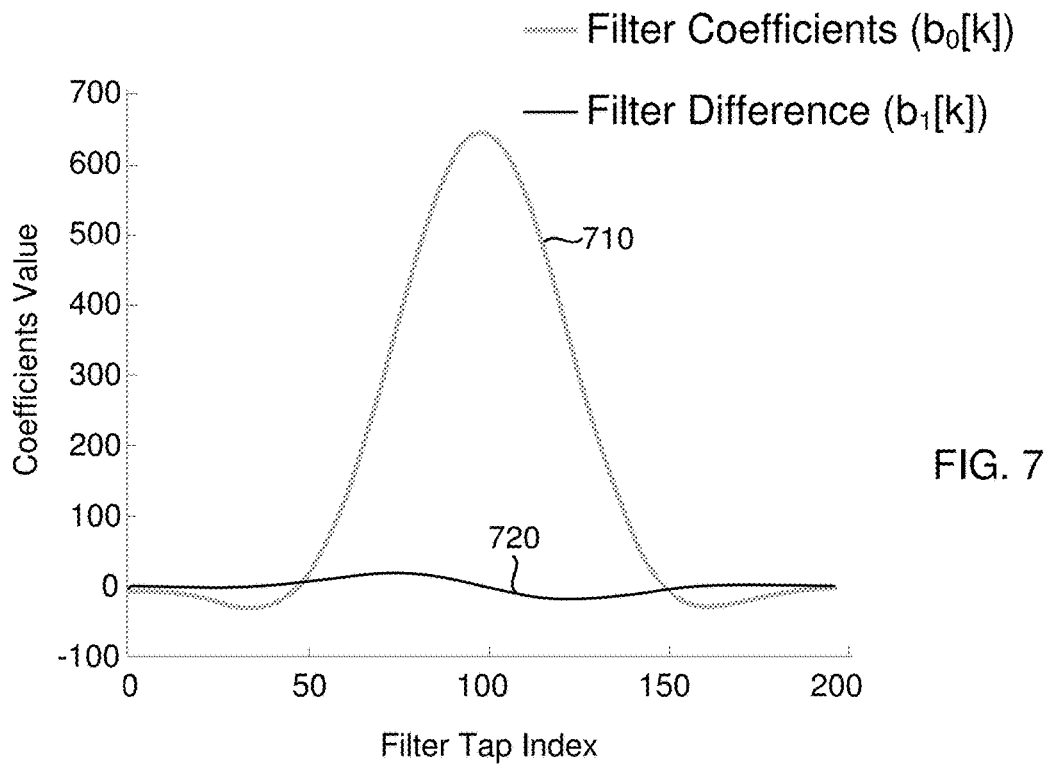
FIG. 7 is a graph illustrating the values of $b_0[l]$ and $b_1[l]$ in an embodiment.

FIG. 7 is a graph illustrating the values of $b_0[l]$ and $b_1[l]$ in an embodiment. In that, X axis representing number of taps in the filter and Y axis representing the values of the coefficients. The curve 710 represents the smooth variation in the values of coefficients $b_0[l]$ of a conventional FIR filter providing the desired performance. The curve 720 represents the values of the coefficients $b_1[l]$ computed as difference between the two adjacent coefficients of $b_0[l]$ in one embodiment. As may be observed, the magnitude of coefficients $b_0[l]$ is smooth with peak value being greater than six hundred, thus requiring at least 10 bits to represents each coefficient $b_0[l]$. On the other hand, the coefficients $b_1[l]$, do not exceed a value greater than thirty-two, thus requiring a maximum of 5 bits to represents the difference coefficients $b_1[l]$.

Figure 8A:
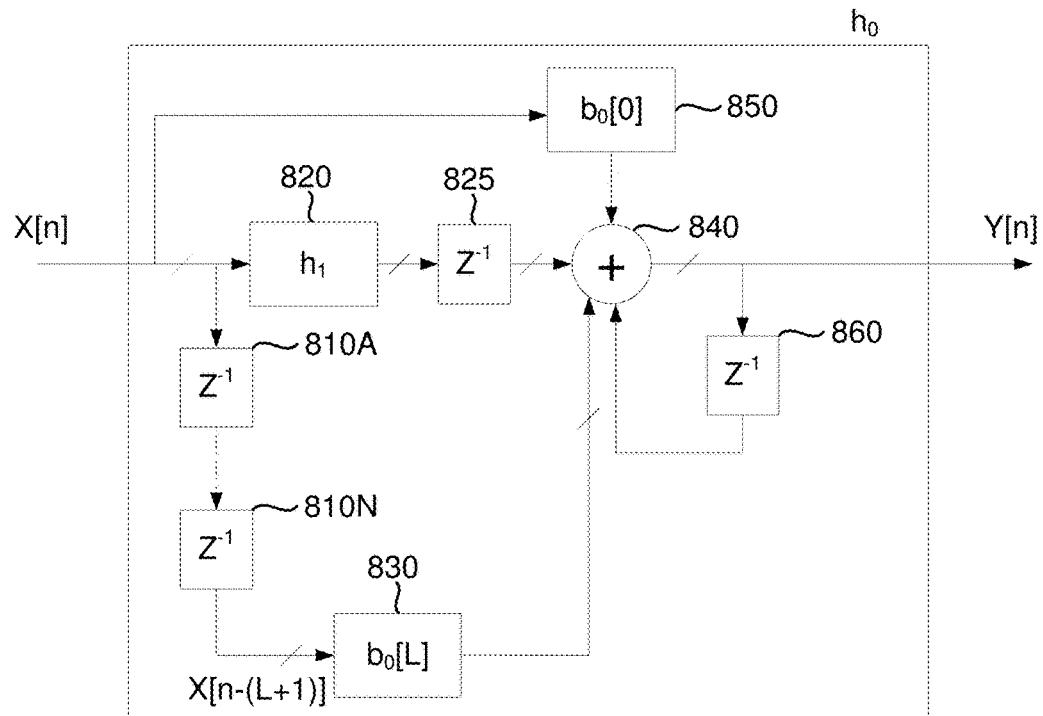
FIG. 8A is an example FIR filter in one embodiment.

FIG. 8A is an example FIR filter in one embodiment. The filter is shown comprising delay elements 810A through 810N, multiplier 830, first order difference filter 820, difference delay element 825, adder 840, and multiplier 850, and feedback delay element 860. Each element is described in further detail below.

The delay elements 810A through 810N generate sequence of samples that are delayed by a factor. In one embodiment delay elements 810A through 810N provides $x[n-(L+1)]$ from $x[n]$ there by providing an overall delay of $[L+1]$ in accordance with the relation (8).

The first order difference filter 820 multiplies the input samples $x[n]$ with the corresponding difference coefficients. In one embodiment, the first order difference filter 820 together with the difference delay element 825 provides $\sum_{q=0}^{L-1}(b_1[q])x[n-q-1]$ in the relation (8) by multiplying the input sample $x[n]$ with corresponding coefficient value $b_1[q]$. In that, the bold lettered $b_1[q]$ represents vector of $b_1[0], b_1[1], b_1[2], \ldots b_1[L-1]$.

The multiplier 830 multiply delayed input samples with the coefficient to generate a component of the compensation factor. In one embodiment, the multiplier 830 multiply delayed sample $x[n-(L+1)]$ with compensation factor $b_0[L]$ and provides the component $b_0[L]x[n-(L+1)]$ in relation (7).

Similarly, the multiplier 850 provides the component in the compensation factor. In one embodiment the multiplier 850 provides $b_0[0]x[n]$ in the relation (7). The feedback delay element 860 provides the delayed output sequence. In one embodiment, the feedback delay element 860 provides $y[n-1]$ in relation (8).

The adder 840 adds the components provided by the elements 810, 830, 850 and 860 to form filter output. In one embodiment, the adder adds the components $\sum_{q=0}^{L-1}(b_1[q])x[n-q-1]$, $y[n-1]$, $b_0[L]x[n-(L+1)]$ and $b_0[0]x[n]$ to form the filter output $y[n]$ in accordance with the relation (8).

Figure 8B:
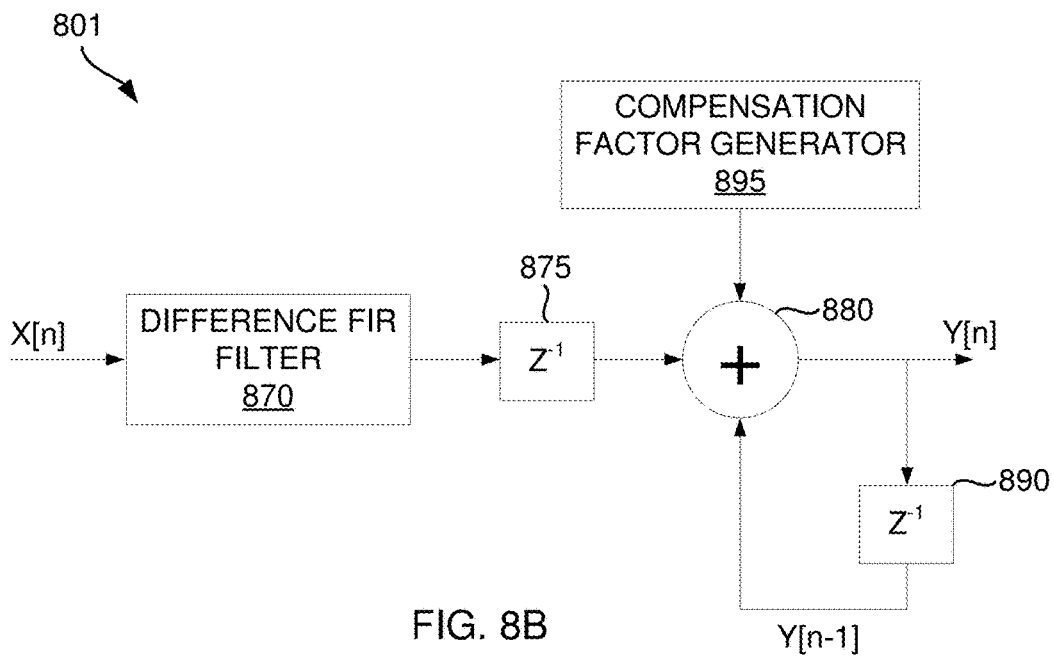
FIG. 8B is an example filter in one embodiment.

FIG. 8B is an example filter in one embodiment. The filter 801 is shown comprising difference FIR filter 870, delay element 875, adder 880, feedback delay element 890, and compensation factor generator 895. The difference FIR filter 870 together with delay element 875 provide a L−1 order FIR filter response with coefficients $b_1[l]$ in accordance with the relation (6). The compensation factor generator 895 generate a value (factor) from the one or more coefficients $b_0[l]$ and the input sequence $x[n]$. In one embodiment the factor is generated using relation:

Compensation Factor $= b_0[0]x[n] + b_0[L]x[n-(L+1)]$ (9)

The feedback delay element 830 provides $y[n-1]$ delayed (by unit time) output of the filter 801. The adder 880 performs summation operation and generates the filter output in accordance with the relation (8) for example, adds the output of the difference FIR filter 810, output of delay element 830, and output of the factor generator 840 to provide the filter output in an embodiment.

Figure 9A:
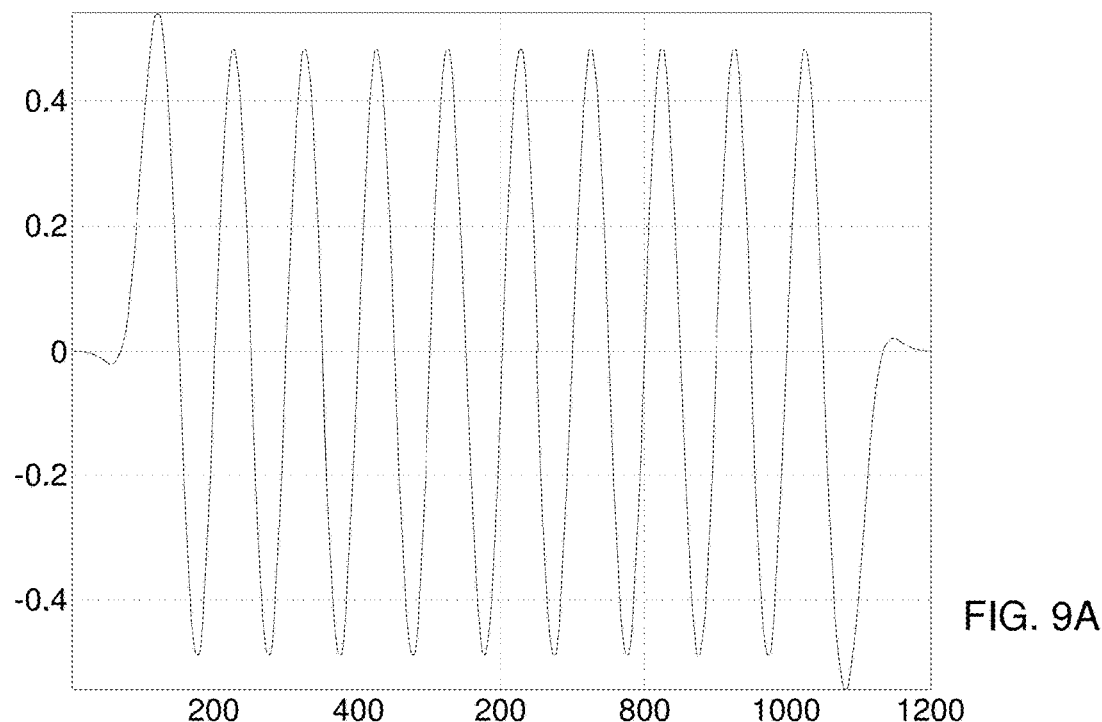
FIG. 9A is an example outputs of a conventional 200 tap low pass FIR filter using $b_0[l]$ coefficients quantized to 11 bits.
Figure 9B:
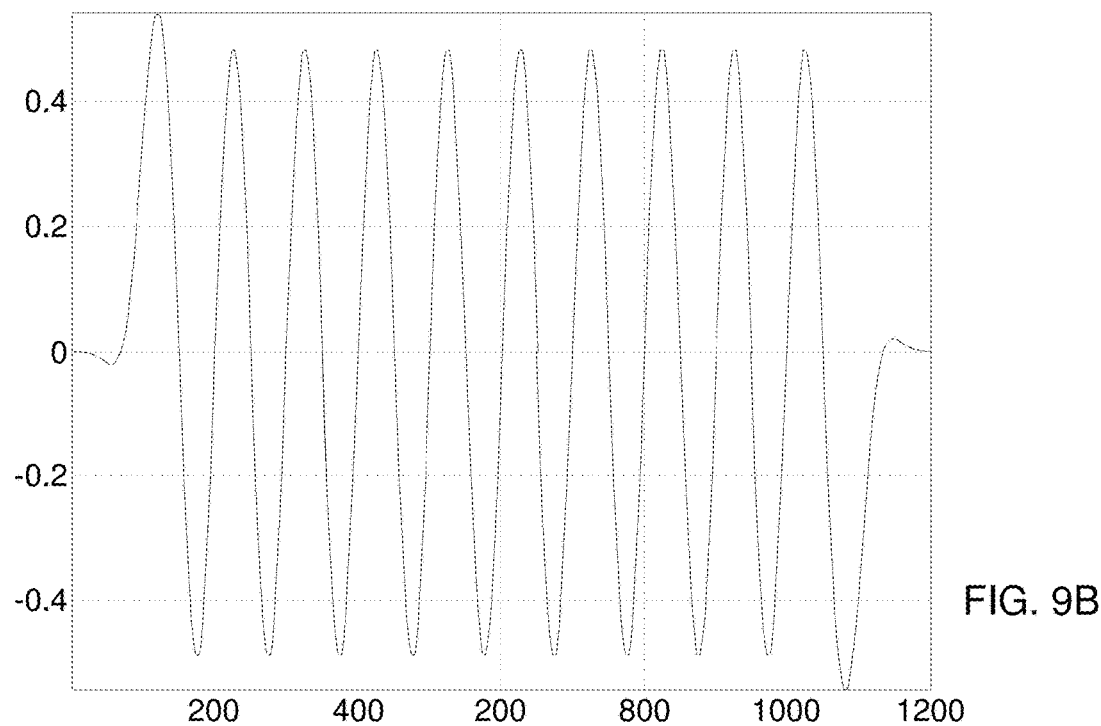
FIG. 9B is an example output of the FIR filter implemented as per the invention involving a difference FIR filter using $b_1[l]$ coefficients represented by 6 bits.

FIG. 9A is an example outputs of a conventional 200 tap low pass FIR filter using $b_0[l]$ coefficients quantized to 11 bits. FIG. 9B is an example output of filter implemented as per the invention using $b_1[l]$ coefficients represented by 6 bits. It may be observed that, the filter output of low pass difference FIR filter matches to that of conventional FIR filter with a match greater than 60 dB. The manner in which the autoregressive filter as per the relation (2) may be implemented in an embodiment is further described below.

Figure 10:
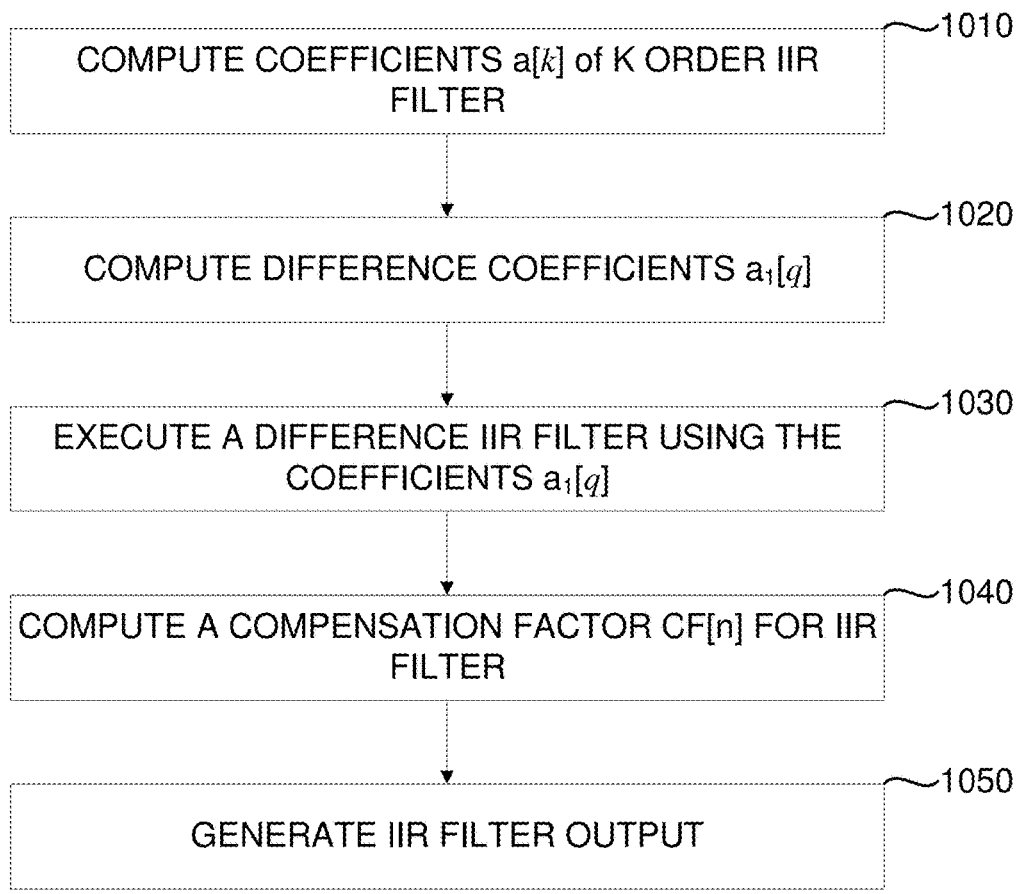
FIG. 10 is a block diagram illustrating example implementation of an IIR filter in an embodiment.

FIG. 10 is a block diagram illustrating example implementation of an IIR filter in an embodiment. The example implementation is described with respect performance of a conventional IIR filter represented by:

$$y[n]=s[n]-\Sigma_{k=1}^{K}a[k]y[n-k], \text{ in that } K \text{ is the order of the conventional IIR.} \quad (10)$$

In the embodiment, in block 1010, coefficients a[k] of K order IIR filter are computed for a desired performance or filter characteristic.

In block 1020, the difference coefficients $a_1[q]$ representing difference between the adjacent coefficients (adjacent taps) are computed. The deference coefficients $a_1[q]$ may be determined in an embodiment by relation:

$$a_1[q]=a[q+2]-a[q+1] \text{ for every } q=0 \text{ to } K-2. \quad (11)$$

In block 1030, a difference IIR filter is implemented using the coefficients $a_1[q]$. In one embodiment the difference IIR filter may be implemented using relation;

$$y_1[n] = \sum_{q=0}^{K-2} (a_1[q])y[n-2-q] \quad (12)$$

In block 1040, a compensation factor is computed. In one embodiment the compensation factor is determined using relation:

$$CF[n]=x[n]-x[n-1]-a[1]y[n-1]+a[K]y[n-(K+1)]+y[n-1] \quad (13)$$

In block 1050, the filter output is generated by subtracting the difference IIR filter output $y_1[n]$ from the compensation factor. In one embodiment the filter output y[n] is generated by relation $y[n]=CF[n]-y_1[n]$. The filter operation in the embodiment may be may be represented as:

$$y[n] = (x[n] - x[n-1]) - a[1]y[n-1] + \quad (14)$$
$$a[K]y[n-(K+1)] + y[n-1] - \sum_{q=0}^{K-2}(a_1[q])y[n-2-q]$$

Due to computation of the difference, the coefficients $a_1[k]$, may be represented with fewer number of bits as against the a[k] thereby reducing the complexity of multiplication in terms of computational power or hardware requirement while maintaining the performance of the filter on par with Conventional IIR filter with coefficients a[k] of relation (10). The relation (14) may be represented in frequency domain (for example, by taking Z-transform on both sides) as:

$$Y[z] = \left[ \frac{1-z^{-1}}{1-z^{-1}(1-a[1]) = z^{-2}\overline{A}_1(z) - z^{-(K+1)}a[K]} \right]X[z], \quad (14.a)$$

in that, $\overline{A}_1$ represents the filter coefficients without $a_0$.

Similarly, the conventional ARMA filter 501 may be implemented with reduced hardware and processing complexity. In one embodiment, the FIR part and IIR part of the conventional ARMA filter may be implemented by relation 8 and 14 respectively to reduce the computational complexity. In one embodiment, the Filter implementation may be represented as:

$$y[n] = b_0[0]x[n] - b_0[L]x[n-(L+1)] + \quad (15)$$
$$\sum_{q=0}^{L-1}(b_1[q])x[n-q-1] + [a[K]y[n-(K+1)] +$$
$$(1-a[1])y[n-1] - \sum_{q=0}^{K-2}(a_1[q])y[n-2-q]$$

Thus, one can see that the conventional ARMA filter can be implemented using the individual difference filter for the MA and AR portion (510 and 520) which results in bit-width savings of the multiplier and adder and hence complexity. The relation (15) may be represented in frequency domain (for example, by taking Z-transform on both sides) as:

$$Y[z] = \left[ \frac{z^{-1}B_1(z) + b_0[0] - b_0[L]z^{-(L+1)}}{1-a[K]z^{-(K+1)} - z^{-1}(1-a[1]) + z^{-2}\overline{A}_1(z)} \right]X[z] \quad (15.a)$$

In one embodiment, the precision of the accumulator $(1-z^{-1})$ is enhanced to maintain the stability of the filter. The manner in which the difference FIR filter may be recursively deployed is described in further detail below.

Figure 11A:
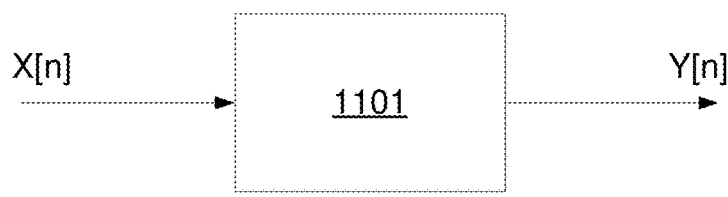
FIG. 11A through 11C are block diagrams illustrating recursive deployment of the difference filters in one embodiment.
Figure 11B:
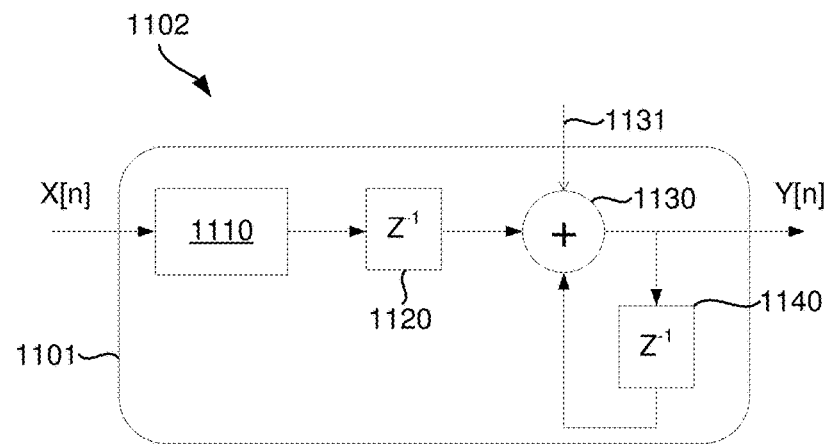
Figure 11C:
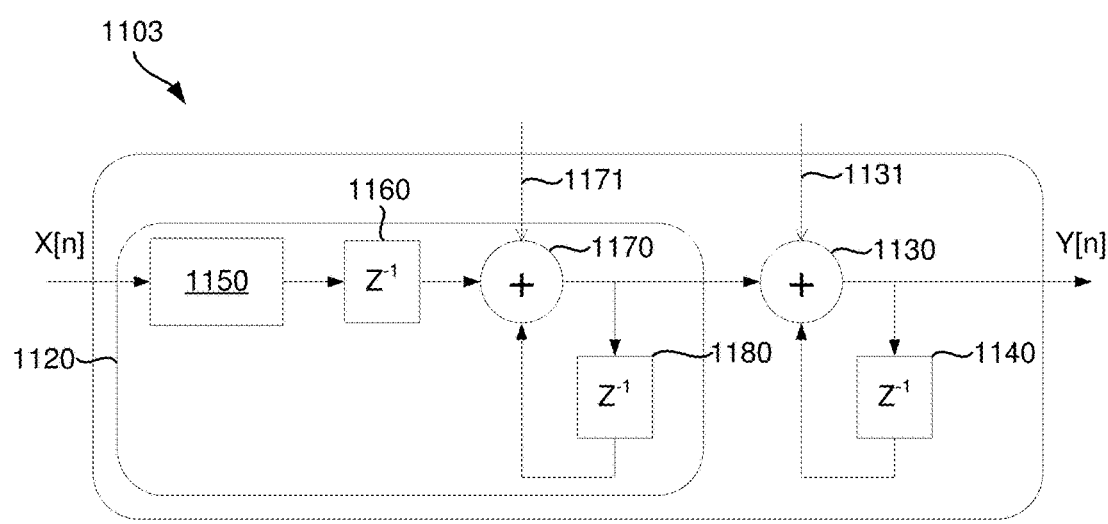

FIG. 11A through 11C are block diagrams illustrating recursive deployment of the difference filters in one embodiment. FIG. 11A is an example conventional N tap FIR filter 1101 with coefficients $b_0[l]$. FIG. 11B is an example filter 1102 implemented with difference filter to provide performance identical to the filter 1101 in an embodiment. In that, the filter 1102 is shown comprising first level difference FIR filter 1110, delay element 1120, the first level adder 1130 and the first level delay element 1140. The first level adder 1130 receives compensation factor CF as in relation (6) on path 1131. The elements, 1110, 1120, 1130 and 1140 respectively operate similar to elements 870, 875, 880, and 890 in the filter 801.

The FIG. 11C is an example filter 1103 implemented to provided performance identical to filter 1101. In that, the first level difference FIR filter 1110 is implemented using a second level difference FIR filter 1150, delay element 1160, second level adder 1170 and second level delay element 1180. The second level adder receives a second compensation factor on path 1171 and may be represented as:

Second Compensation Factor=$b_1[0]X[n]+b_1[L-1]X[n-L]$ (7)

The second level adder output is provided to the first level adder 1130.

The second level difference FIR filter 1150 is implemented using coefficients $b_2[k]$. The coefficients $b_2[k]$ are derived as difference between the adjacent coefficients $b_1[k]$. Thus, the coefficients $b_2[k]$ may be represents with lesser number of bits compared to the coefficients $b_1[k]$, thereby, further reducing the complexity.

The second level difference FIR filter 1150 is of N−2 taps while the first level difference FIR filter is of N−1 taps. As a result, the number of taps remains same at each level of recursion. Thus, the latency is maintained as in the N tap FIR filter.

The use of difference FIR filter for implementing a FIR filter of desired performance, the number of bits required to store coefficients is reduced at each level. Further the use of difference FIR filter for implementing a FIR filter of desired performance maintain symmetry and anti-symmetry at all level thus ensuring the linear phase. Further, the difference FIR filter may be deployed along with or on top of other conventional complexity reduction techniques such as CSD representation for example, for further reduction. The difference FIR filter may be implemented for fixed coefficients and the programmable coefficients.

While various embodiments of the present disclosure have been described above, it should be understood that they have been presented by way of example only, and not limitation. Thus, the breadth and scope of the present disclosure should not be limited by any of the above-discussed embodiments, but should be defined only in accordance with the following claims and their equivalents.

What is claimed is:

1. A method of filtering a digital signal with a first filter performance comprising:
   determining a first set of coefficients that provide the first filter performance;
   computing a second set of coefficients from the first set of coefficients;
   providing the digital signal to a difference filter with second set of coefficients to produce a difference filter output; and
   adding a compensation factor to the difference filter output to generate a filtered output of the digital signal with a second filter performance identical to the first filter performance.

2. The method of claim 1, wherein second set of coefficients are formed as difference between the successive first set of coefficients such that when the first set of coefficients comprises N number of coefficients, the second set of coefficients comprises N-1 number of coefficients.

3. The method of claim 1, wherein second set of coefficients are formed as difference between the non successive first set of coefficients such that when the first set of coefficients comprises N number of coefficients, the second set of coefficients comprises N-1 number of coefficients.

4. The method of claim 1, further comprising:
   computing first set of coefficients according to a first relation;
   computing the second set of coefficients according to a second relation;
   generating the difference filter output in accordance with a third relation;
   computing a compensation factor in accordance with a fourth relation; and
   generating a filtered output samples from a set of input samples in accordance with a fifth relation.

5. The method of claim 4, wherein:
   the first relation is $y[n]=\Sigma_{l=0}^{L} b_0[l]x[n-l]$, in that the $b_0[l]$ representing first set of coefficients, $y[n]$ is the digital filter output with first filter performance, and $x[n-l]$ representing the delayed input samples;
   the second relation is; $b_1[l]=b_0[l]-b_0[l-1]$ for every $l=1$ to L, in that the $b_1[l]$ representing the second set of coefficients, $b_0[l]$ and $b_0[l-1]$ representing the successive first set of coefficients;
   the third relation is; $y_1[n]=\Sigma_{q=0}^{L-1}(b_1[q]) X[n-q-1]$, in that $y1[n]$ representing the difference filter output;
   the fourth relation is $CF[n]=b_0[0]x[n]+b_0[L]x[n-(L+1)]+y[n-1]$ in that $CF[n]$ representing the compensation parameter; and
   the fifth relation is $$y\sim[n]=y[n-1]+b_0[0]x[n]+b_0[L]x[n-(L+1)]+\Sigma_{q=0}^{L-1}(b_1[q]) x[n-q-1],$$

in that the $y\sim[n]$ representing the filtered output with second performance and $x[n]$ representing the input samples.

6. The method of claim 4, wherein,
   the first relation is $y[n]=x[n]-\Sigma_{k=1}^{K} a[k]y[n-k]$ in that the $a[k]$ representing first set of coefficients, $y[n]$ is the digital filter output with first filter performance, and $x[n]$ representing the input samples;
   the second relation is $a_1[q]=a[q+2]-a[q+1]$ for every $q=0$ to K-2, in that the $a_1[q]$ representing the second set of coefficients, $a_0[q+2]$ and $a_0[q+1]$ representing the successive first set of coefficients;
   the third relation is $y_1[n]=\Sigma_{q=0}^{K-2}(a_1[q]) y[n-2-q]$, in that in that $y1[n]$ representing the difference filter output;
   the fourth relation is $CF[n]=x[n]-x[n-1]-a[l]y[n-1]+a[K]y[n-(K+1)]+y[n-1]$ in that $CF[n]$ representing the compensation parameter; and a filtered output with second performance follows the relation $y\sim[n]=(x[n]-x[n-1])-a[l]y[n-1]+a[K]y[n-(K+1)]+y[n-1]-\Sigma_{q=0}^{K-2}(a_1[q]) y[n-2-q],$ in that the $y\sim[n]$ representing the filtered output with second performance and $x[n]$ representing the input samples.

7. The method of claim 1, further comprising;
   determining a third set of coefficients from the second set of coefficient;
   computing a second level compensation factor from the first and the second set of coefficients;
   forming a second level difference digital filter with third set of coefficients to produce a second level difference filter output; and
   adding the second level compensation factor to the second level difference filter output to achieve a third performance identical to the first filter performance,
   wherein the first set of coefficients comprises N number of coefficients, the second set of coefficients comprises N-1 number of coefficients and the third set of coefficients comprises N-2 number of coefficients.

8. A signal conditioning device for filtering a digital signal to provide a filtered output with a first filtering performance requiring a first set of coefficients ranging over first range value comprising:
   a first difference filter operative to provide a first difference filter output wherein, the first difference filter incorporating a second set of filter coefficients derived from the first set of filter coefficients wherein the second set of filter coefficients ranging over a second range value lesser than the first range value;
   a first compensation factor generator operative to generate a first compensation factor; and
   an adder operative to add the first difference filter output, the first compensation factor, and the filtered output delayed by a unit time to provide the filtered output without using the first set of filter coefficients.

9. The signal conditioning device of claim 8, wherein the first difference filter comprising L numbers of taps and the difference filter implemented to according to a relation $y_1[n]=\Sigma_{q=0}^{L-1}(b_1[q]) X[n-q-1]$, in that $y_1[n]$ representing the first difference filter output, $b_1[q]$ representing a first set of L tap coefficients, $X[n-q-1]$ representing the digital signal delayed by the corresponding q-1 unit time and the operation within the summation indicating the multiplication operation.

10. The signal conditioning device of claim 8, wherein the first difference filter comprising K-1 numbers of taps and the difference filter implemented to according to a relation $y_1[n]=\Sigma_{q=0}^{K-2}(a_1[q])\,y[n-2-q]$, in that $y_1[n]$ representing the first difference filter output, $a_1[q]$ representing a first set of K−1 tap coefficients, $y[n-2-q]$ representing the filtered output signal delayed by corresponding n−2−q unit time and operation within the summation indicating the multiplication operation.

11. The signal conditioning device of claim 9, wherein the a first compensation factor is equal to $b_0[0]x[n]+b_0[L]x[n-(L+1)]$, in that x[n] representing the digital signal, $x[n-(L+1)]$ representing digital signal delayed by corresponding L+1 unit time, $b_0[L]$ and $b_0[0]$ respectively representing first constant and a second constant providing a first filter performance.

12. The signal conditioning device of claim 10, wherein the a first compensation factor is equal to $x[n]-x[n-1]-a[1]y[n-1]+a[K]y[n-(K+1)]+y[n-1]$, in that x[n] representing the digital signal, x[n] and x[n−1)] representing the digital signal and the digital signal delayed by unit time, $y[n-(K+1)]$ and y[n−1] representing the filtered output delayed by K+1 units time and one unit time, and a[1] and a[K] respectively representing a first constant and a second constant providing a first filter performance.

13. A signal conditioning device of claim 8, further comprising a second difference filter to provide a second difference filter output and a second compensation factor generator to generate a second compensation factor, wherein the adder is operative to add the first difference filter output, second difference filter output, the first compensation factor, the second compensation factor.

14. The signal conditioning device of claim 13, wherein the first difference filter comprising L numbers of taps and the difference filter implemented to according to a relation $y_1[n]=\Sigma_{q=0}^{L-1}(b_1[q])\,X[n-q-1]$, in that $y_1[n]$ representing the first difference filter output, $b_1[q]$ representing a first set of L tap coefficients, $X[n-q-1]$ representing the digital signal delayed by the corresponding q−1 unit time, and the second difference filter comprising K−1 numbers of taps and the second difference filter implemented according to a relation $y_1[n]=\Sigma_{q=0}^{K-2}(a_1[q])\,y[n-2-q]$, in that $y_1[n]$ representing the second difference filter output, $a_1[q]$ representing a second set of K−1 tap coefficients, $y[n-2-q]$ representing the filtered output signal delayed by corresponding n−2−q unit time and the operation within the summation indicating the multiplication operation.

15. A method of implementing a digital filter with a performance of an N tap Finite Impulse Response (FIR) filter comprising:
 determining a set of first coefficients corresponding to an N taps of the FIR filter, wherein each of the first coefficient is represented with first number of bits;
 finding the difference between the successive first coefficients of the N taps to form N−1 difference coefficients, wherein each of the N−1 difference coefficients is represented with the second number of bits that is less than the first number of bits;
 Implementing N−1 taps FIR filter with N−1 difference coefficients to provide difference filter output;
 adding a first compensation factor to the difference filter output.

16. The method of claim 15, further comprising:
 finding the difference between the successive N−1 difference coefficients of to form N−2 difference coefficients, wherein each the N−2 difference coefficients is represented with a third number of bits that is less than the second number of bits;
 Implementing N−2 taps FIR filter with N−2 difference coefficients to provide the difference filter output;
 adding a second compensation factor to the difference filter output.

* * * * *